(12) United States Patent
Skjaeveland

(10) Patent No.: US 6,607,040 B2
(45) Date of Patent: Aug. 19, 2003

(54) WORKING TOOL WITH REPLACEABLE WORKING BIT

(75) Inventor: Magne Skjaeveland, Kvernaland (NO)

(73) Assignee: Kverneland Klepp AS (NO)

( * ) Notice: Subject to any disclaimer, the term of this patent is extended or adjusted under 35 U.S.C. 154(b) by 0 days.

(21) Appl. No.: 10/049,714

(22) PCT Filed: Jan. 31, 2001

(86) PCT No.: PCT/GB01/00387

§ 371 (c)(1),
(2), (4) Date: Feb. 15, 2002

(87) PCT Pub. No.: WO01/56360

PCT Pub. Date: Aug. 9, 2001

(65) Prior Publication Data

US 2003/0037936 A1 Feb. 27, 2003

(30) Foreign Application Priority Data

Feb. 4, 2000 (GB) .............................. 0002536
May 31, 2000 (GB) .............................. 0013050

(51) Int. Cl.⁷ ........................ A01B 15/02; A01B 23/02
(52) U.S. Cl. ........................ 172/749; 172/753; 37/455
(58) Field of Search ................. 172/749, 750, 172/757, 677, 683, 698, 699, 701.2, 701.3, 713, 719, 720, 721, 753, 772, 772.5; 37/446, 452, 454, 455, 456, 457, 458

(56) References Cited

U.S. PATENT DOCUMENTS

| | | | | |
|---|---|---|---|---|
| 2,783,701 A | * | 3/1957 | Padrick | 172/699 |
| 3,082,555 A | | 3/1963 | Hill | |
| 3,897,642 A | * | 8/1975 | Helton et al. | 37/458 |
| 4,269,274 A | | 5/1981 | Robertson et al. | 172/699 |
| 4,415,042 A | | 11/1983 | Cosson | 172/749 |
| 4,625,439 A | * | 12/1986 | Johansson et al. | 37/456 |
| 4,625,810 A | * | 12/1986 | Edmisson | 172/749 |
| 4,754,816 A | | 7/1988 | Edmission | 172/749 |
| 4,871,032 A | * | 10/1989 | McGuire et al. | 172/749 |
| 4,905,386 A | | 3/1990 | Taylor | 37/195 |
| 5,027,535 A | * | 7/1991 | Maguina-Larco | 37/455 |
| 5,152,087 A | * | 10/1992 | Maguina-Larco | 37/452 |
| 5,711,378 A | * | 1/1998 | Yeager | 172/730 |
| 6,289,996 B1 | * | 9/2001 | Parish | 172/730 |

FOREIGN PATENT DOCUMENTS

| | | |
|---|---|---|
| DE | 1192436 | 5/1965 |
| DE | 2655792 | 6/1978 |
| DE | 3340429 | 5/1985 |
| DE | 3628910 | 3/1988 |
| DE | 3718819 | 12/1988 |

* cited by examiner

Primary Examiner—Thomas B. Will
Assistant Examiner—Nathan Mammen
(74) Attorney, Agent, or Firm—Madson & Metcalf

(57) ABSTRACT

A replaceable wear part for mounting on a leading edge of a working tool, the leading edge and the wear part having co-operative guide formations extending generally perpendicular to the leading edge and which provide a socket and projection type of slidable inter-fit whereby the wear part can be driven by a force extending generally perpendicular to the leading edge in order to take-up a working position in which it is secured against displacement from the working position by frictional interengagement between the guide formations on the wear part and the leading edge, and without need for threaded or other separate removable fasteners.

11 Claims, 6 Drawing Sheets

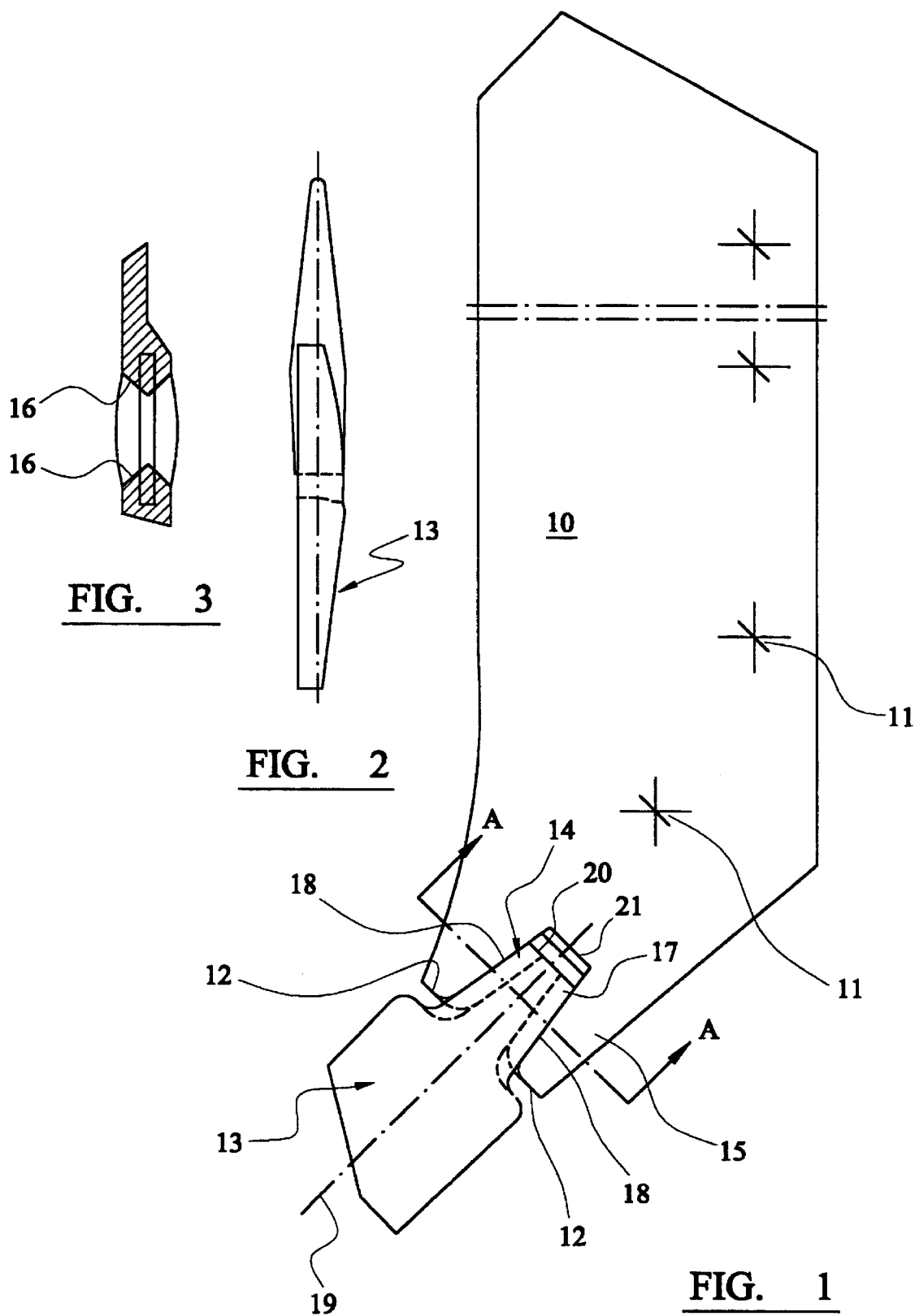

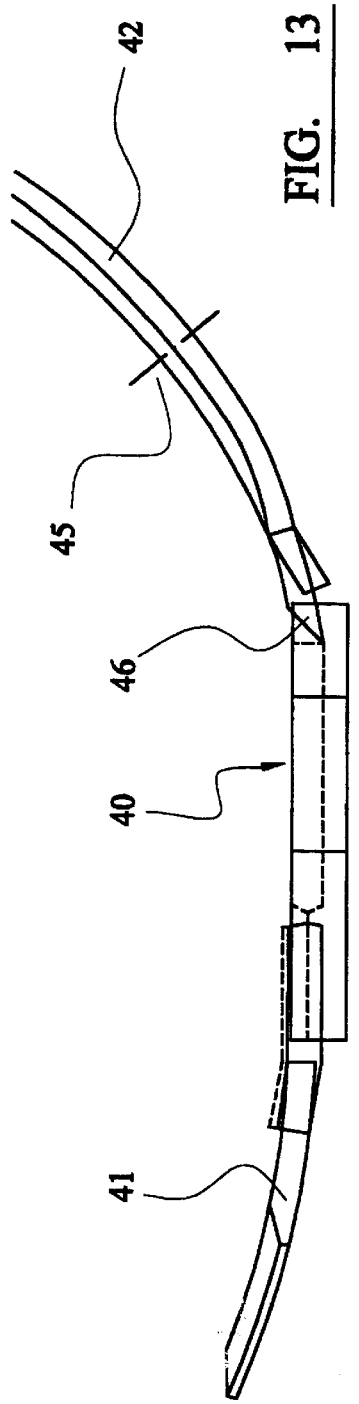
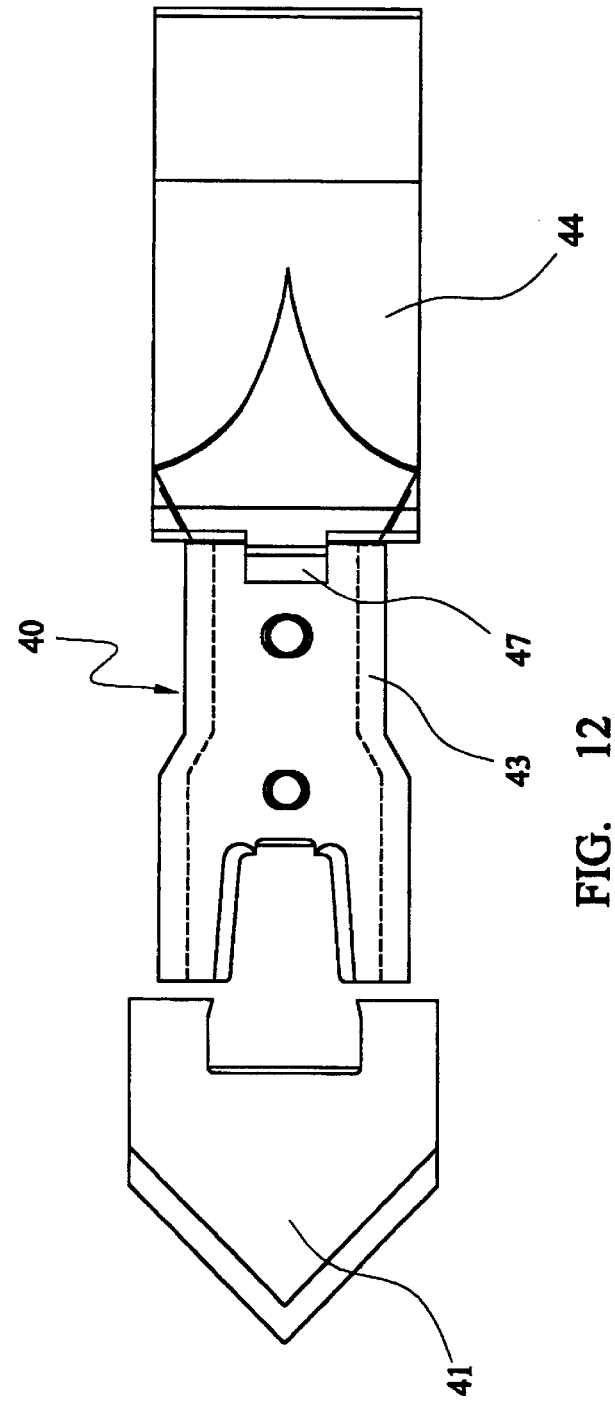

WORKING TOOL WITH REPLACEABLE WORKING BIT

This invention relates to a working tool with a replaceable working bit, and also to the replaceable working bit per se.

The invention is concerned generally with a working tool, which necessarily is provided with one or more working edge or face which is designed to work on a particular material, and which therefore is exposed to wearing action over a period of time.

However, the invention has been developed primarily in connection with a working tool which is capable of working on soil or similar material e.g. sand, gravel, stone, rubble, and which usually has a working edge to engage the working material concerned. The working edge will be subject to wear over a greater or lesser period of time, depending upon the required operation, and the material being handled.

In some blade-type of working tools, it is acceptable to carry out sharpening of the edge as it becomes worm, and this can be done a number of times (by progressive erosion into the main body of the tool) but eventually the entire tool has to be scrapped. In other working tools, it is known to provide replaceable working edges, which are secured to the main body of the tool by threaded fasteners e.g. bolts or screws, and which are sacrificial, in the sense that the working edges protect the main body of the tool from wear (which is the expensive component), and which are replaced when an unacceptable level of wear has occurred in the replaceable part.

In connection with soil working tools for use in agriculture, there are many examples of working elements or working "bits" which are replaceably mounted on the main body of the tool concerned e.g. a "point" on the share of a plough, a knife on a plough body, or a tip of a cultivator tine.

In all of these arrangements, it is usual to mount the working element in position by means of two separate threaded fasteners. This gives a robust mounting of the elements, and by reason of using two separate fasteners, the element is well able to resist any twisting or turning moments which may be applied to the element in service, in addition to providing shear resistance to any direct forces tending to separate the element from the tool.

Evidently, when it become necessary to replace a worn element, the two fasteners have to be released, and a replacement element then installed in place. If this is carried out "in the field", this is a time consuming and difficult task, especially, as is often the case, the fasteners or nut fixings have become damaged, rusted or otherwise become difficult to release. The same will apply in respect of routine maintenance carried out prior to use. In extreme cases, it is necessary to use a cutting torch to release the fasteners.

Bearing in mind that a large cultivator might have up to sixty separate cultivator tines (each with its own replaceable tip), it can be a major operation to replace a full set of worn tips.

In extreme soil conditions e.g. heavy clay plus flints, a new set of cultivator tips can become worn within three hours and then need replacement. A tractor to propel such large cultivators might cost of the order of £200,000 (about $315,000), and is therefore an extremely expensive piece of capital equipment, and possible "downtime" of the order of three hours represents a serious under utilisation of such a high capital cost item.

With a view to simplify the assembly and dis-assembly of replaceable wearing parts, it is known to provide a mounting arrangement on the main body of the tool which only requires a single fastener, but necessarily this requires the provision of a suitably shaped seating which holds the wearing part captive against rotation about the axis of the single fastener.

One example of such a known mounting arrangement comprises an assembly of a replaceable wearing part on a main body of a cultivator tine, in which the wearing part has a rectangular body which merges into a V-shaped tip at one end, and on its opposite end it has a narrow projecting lug. A single fastener is taken through the body and through a mounting hole in the tine, and a shaped socket or receiving recess also in the tine receives the projecting lug in order to provide resistance to any turning action which may be applied in service to the tip and tending to rotate the tip about the axis of the fastener.

In this known arrangement of replaceable cultivator tip, there is still the disadvantage of assembly and dis-assembly of the fastener, but in addition the projecting lug only forms a narrow prolongation of the main body of the tip i.e. the main-body is much wider than the lug, and the lug is therefore the sole means of resisting turning forces applied to the tip about the axis of the fastener. Therefore, this construction relies for its strength on the narrow lug, and on which highly concentrated stresses may be generated in service which may result in premature failure.

The invention therefore seeks to provide a novel arrangement of replaceable wear part or bit for mounting on a leading edge of a working tool, and which can be mounted in a working position on the tool, and be secured against displacement from the working position, without need for threaded or other separate removable fastener(s).

According to one aspect of the invention there is provided a replaceable wear part for mounting on a leading edge of a working tool, said leading edge and said wear part having co-operative guide formations extending generally perpendicular to the leading edge and which provide a socket and projection type of slidable interfit whereby the wear part can be driven by a force extending generally perpendicular to the leading edge in order to take-up a working position in which it is secured against displacement from the working position by frictional interengagement between the guide formations on the wear part and the leading edge, and without need for threaded or other separate removable fastener.

Therefore, a replaceable wear part according to the invention can be driven e.g. by a hammer to take-up its working position, and the co-operative guide formations allow the wear part to slide in a direction generally perpendicular to the leading edge. The guide formations are arranged to exert a wedging action on the wear part, so that the greater the distance travelled, the stronger will be the frictional engagement forces acting between the guide formations.

In a preferred arrangement, the guide formations in the leading edge of the tool form a socket whose width reduces with distance perpendicularly inwardly of the leading edge, so that a progressively increasing wedging force can act on a wear part as it is driven internally of the socket.

The socket may be defined between a pair of opposed side walls which are convergent or taper, and the wear part has opposed external side faces which are also convergent or taper, but to a greater extent than the tapering of the side walls of the socket, so that an increasing wedging force is generated therebetween as the wear part is driven to its working position, whereby also the frictional resistance against possible displacement increases progressively.

The co-operative guide formations preferably also have an interengagement which opposes any relative rotation of the wear part about its longitudinal axis.

The walls or faces defining the guide formations may be of matching V-shape in cross section, though other cross sectional shapes may be provided, such as to oppose rotation of the wear part about its longitudinal axis, and relative to the leading edge.

Preferably, the invention comprises an assembly of the replaceable wear part and the working tool in combination.

The wear part may comprise a working bit to be mounted on a transversely extending leading edge of an agricultural tool, such as a "point" (preferably a reversible point), a ploughshare, or a cultivator tine. However, the invention may be applied to other types of working tool than agricultural tools e.g. an excavator bucket (front or rear mounted), or a loading shovel, each having a leading edge provided with excavator teeth mounted thereon along the length of the leading edge, in which each excavator tooth comprises a replaceable wear part according to the invention.

Preferred embodiments of the invention will now be described in detail, by way of example only, with reference to the accompanying drawings, in which:

FIG. 1 is a plan view of a first embodiment of the invention in the form of a ploughshare in assembly with a wear replaceable part, or "bit" which is force-fitted in order to take-up a mounting position in the leading edge of the share;

FIG. 2 is a side view of the assembly;

FIG. 3 is a section taken on the section line A—A in FIG. 1, and showing the engagement between the external side faces of a mounting portion of the wear part, and the side profiles of the socket defined in the leading edge of the share;

FIG. 12 is a plan view of a fourth embodiment of the invention; and,

FIG. 13 is a side view of the fourth embodiment.

Figures 4, 5:
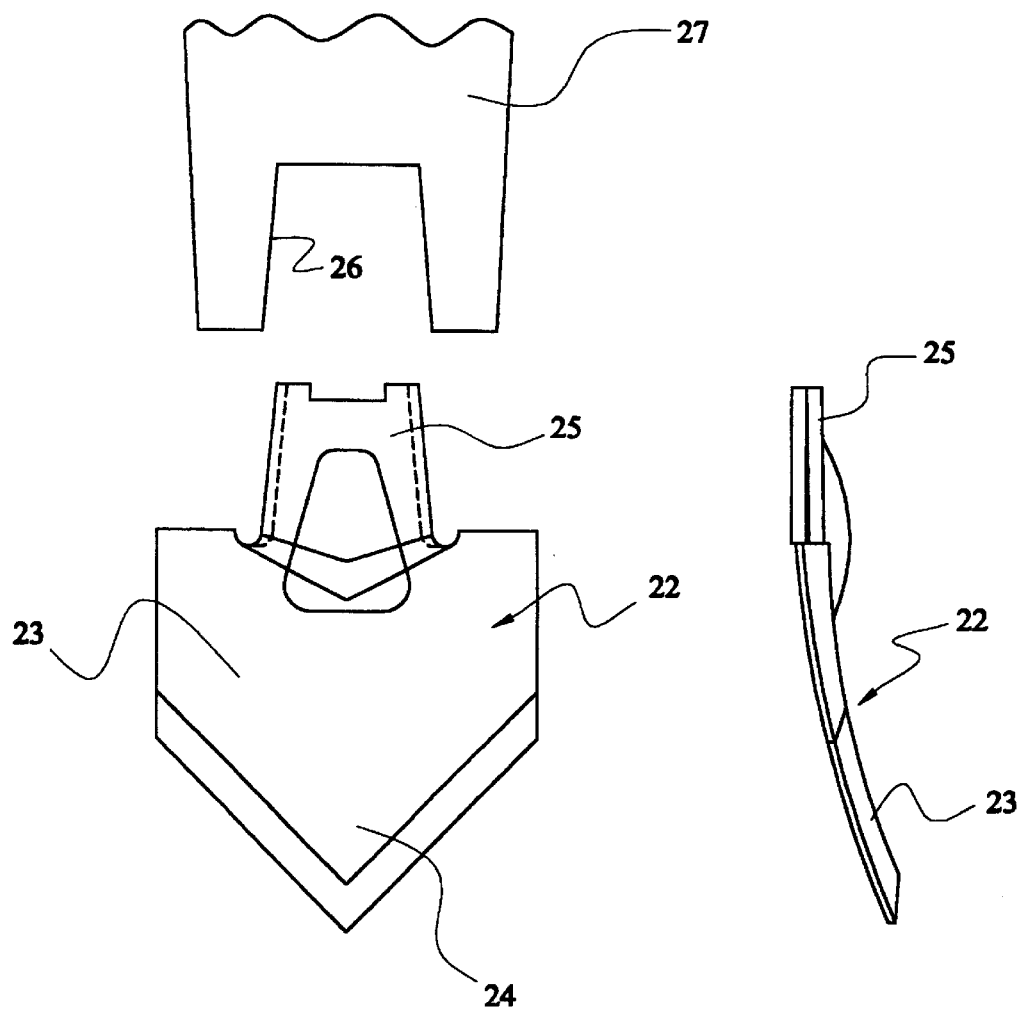
FIG. 4 is a plan view of a second embodiment of the invention in the form of a replaceable tine point tip for mounting on the end of a tine, shown in exploded, unassembled form.
FIG. 5 is a side view of the tine point tip shown in FIG. 4.

Referring now to the drawings, there will be described preferred embodiments of replaceable working part or bit according to the invention, and adapted for mounting on a working tool having one or more working edge or face which is designed to work on a particular material, and which is exposed to wearing action over a period of time.

The preferred embodiments which will be described comprise soil working tools for use in agriculture, but it should be understood that the invention has wider application, and can be applied to replaceable working bits per se, and to other types and combinations of working tool requiring replaceable working bits to be mounted thereon, and without need for threaded or other fasteners to assemble and disassemble the combination.

Referring first to FIGS. 1 to 3, a first embodiment of the invention is illustrated, and which comprises the combination of a plough share (and a replaceable wear part or "bit"), designated generally by reference 10, and which has usual mounting holes 11 along its lower edge, whereby the share 10 can be mounted on a plough, and when mounted in position, it is the transversely extending leading end or edge 12 of the share 10 which is the frontal part of the share and which first engages the soil during forward movement of the plough body. A replaceable wear part or bit, designated generally by reference 13, is mounted (by force-fit) in the leading end 12 of the share 10, so that it takes up a working position, after being driven by a force extending generally perpendicular to the leading edge 12 e.g. by a hammer. In the working position, the wear part 13 is secured against displacement from the working position by frictional interengagement between co-operative guide formations on the wear bit 13 and a suitable receiving formation provided in the leading edge, and without need for threaded or other separate removable fasteners.

In the illustrated embodiment, a receiving socket 14 is formed in the leading end region 15 of the share 10, and socket 14 is defined by a pair of opposed profiled side edges 16 (see FIG. 3) which converge or taper, as can be seen in FIG. 1, whereby a progressively increasing wedging action is applied to a projecting mounting portion 17 of the wear bit 13.

The mounting portion 17 has opposed external side edges 18, which also are convergent, but to a lesser extent than the convergence of the side edges 16 of the socket 14, whereby progressive axial movement of the mounting portion 17 inwardly of the socket 14 results in a progressively increasing wedging action, and frictional force acting between the co-operative guide formations (the internal side faces 16 of socket 14 and the external sides 18 of mounting portion 17).

The wear bit 13 is made of suitable hard wearing material e.g. forged metal, and clearly the greater part of any wearing action applied to the combination of the share 10 and bit 13 will be borne by the bit 13, since it is the first part of the combination to engage unworked soil. The working forces applied to the bit 13 will generally tend to force the mounting portion 17 still further into the socket 14, and therefore during normal operation, there is no risk of the bit 13 becoming dislodged from its mounting position. Evidently, any forces applied to the bit 13 other than axially extending forces, may apply a turning moment to the bit 13, but any rotation of the bit 13 in the socket 14 will be resisted by the way in which the guide formations inter-engage. Furthermore, any possible tendency of the bit 13 to rotate about its general longitudinal axis 19 will be borne by the co-operative inter-engagement between each external side 18 of mounting portion 17 and the corresponding internal side edges 16. As can be seen clearly from FIG. 3, each of the co-operative guide formations is V-shaped, and clearly the inter-engagement will be such as to strongly oppose any rotational forces applied to the wear bit 13, about the longitudinal axis 19.

In use of the combination of the share 10 and the wear bit 13, the share 10 will be exposed to wearing action as it moves through the soil, but the major part of any wearing forces will be borne by the wear bit 13, and which will be made of suitable wear resistant material, and this in combination with the robust but simple mode of mounting in position, will mean that the wear bit is exposed to the major wearing action, thereby prolonging the effective life of the share 10.

The wear bit 13 can be easily mounted in position, by simple application of a driving force e.g. by a hammer, which force fits the mounting portion 17 into the socket 14. However, the wear bit 13 will be exposed to wearing action over a period of time, and when an unacceptable level of wear has occurred, it is a simple matter to dis-assemble the combination, by insertion of a wedging tool (not shown) between the inboard end 20 of the mounting portion 17 and the inner end 21 of the socket 14. Therefore, replacement of a worn bit 13 can take place easily, either during routine maintenance, or in the field when necessary, and without need to release threaded fasteners as used in known arrangements.

Evidently, the combination shown in FIGS. 1 to 3, is a socket and projection type of inter-fit, and in which the projection is provided on the wear part 13 and the socket is provided in the leading end of the share 10. However, these arrangements could be reversed, whereby a mounting projection extends from the leading end 12 of the share 10, and a wear part with a receiving socket or recess can be driven onto the projection. A similar wedging action, and also resistance to rotation will be provided by the co-operative engagement between the respective guide formations.

Figure 9:
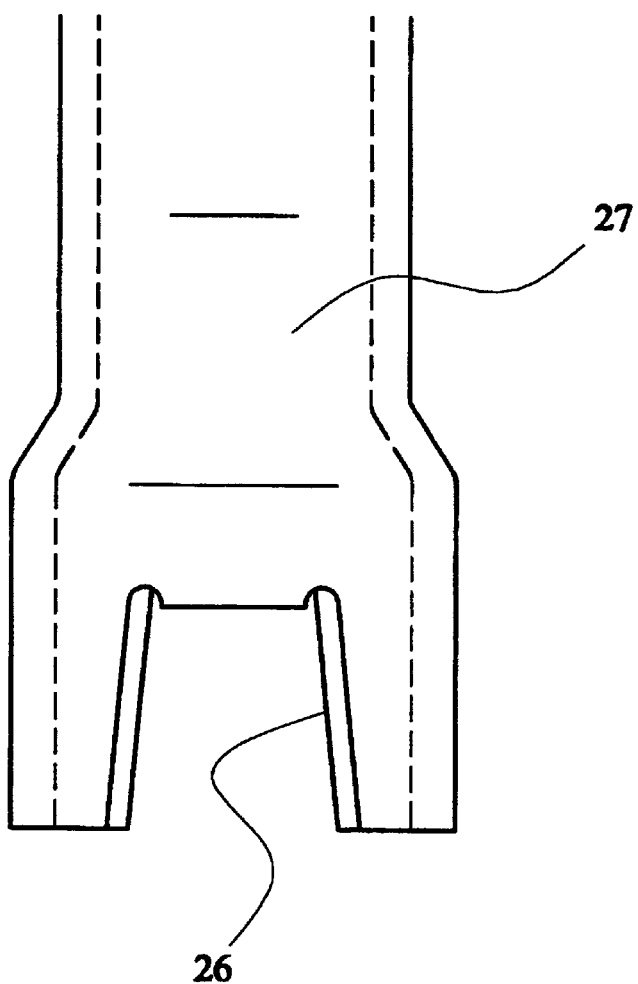
FIG. 9 is a plan view of the leading end of a cultivator tine, showing the recess or socket which receives the mounting portion of the tine point tip (of FIG. 4 or 6)
Figure 10:
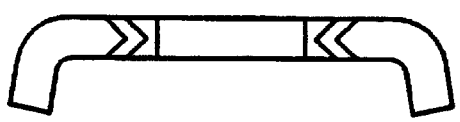
FIG. 10 is an end view showing the side profiles of the socket.

Referring now to FIGS. 4 and 5, there is a shown a second embodiment of the invention, applied to a cultivator tine (see also FIGS. 9 and 10), and replaceable tine point tip. The tip is shown in FIG. 4, and designated generally by reference 22, and having a rectangular main body 23, and which is provided with a V-shaped tip 24 at one end, and a rearwardly projecting mounting portion 25 at its opposite end. The mounting portion 25 performs a similar function to mounting portion 17 of wear bit 13 in the first embodiment, and is driven into frictional engagement in a socket or recess 26 formed in a lower mounting end 27 of a cultivator tine (shown in exploded, unassembled form). The inter-engagement between the mounting portion 25 and recess 26 is generally the same as in the first embodiment, and after driving of the tine point tip 22 (which is a further example of a replaceable wear part or bit) to a working position in the recess 26, the frictional inter-engagement between the co-operative guide formations is sufficient to hold the tip 22 in the working position. Also, as in the previous embodiment, there is resistance to any turning moments which may be applied in service to the tip 22, by the co-operative engagement between the guide formations.

Figure 8:
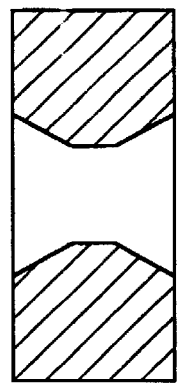
FIG. 8 is a cross section taken on the section line A—A in FIG. 6, and showing the slidable interengagement between the external side faces of a mounting portion of the tine point tip, and the side profiles of the socket provided in the leading end of the cultivator tine which receives the mounting portion.
Figure 7:
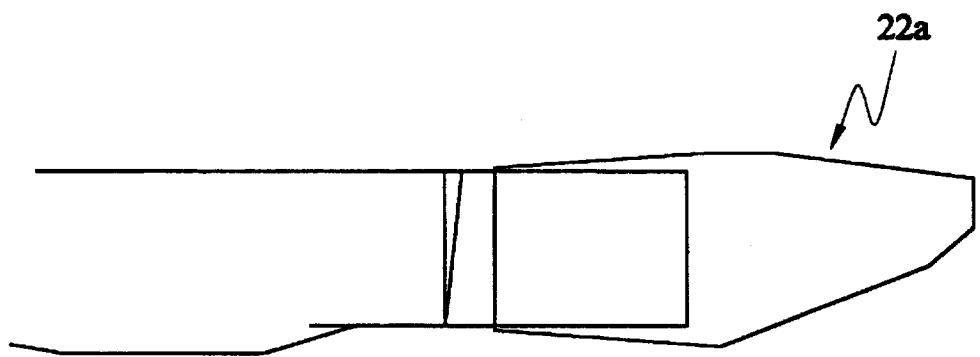
FIG. 7 is a side view corresponding to FIG. 6.
Figure 6:
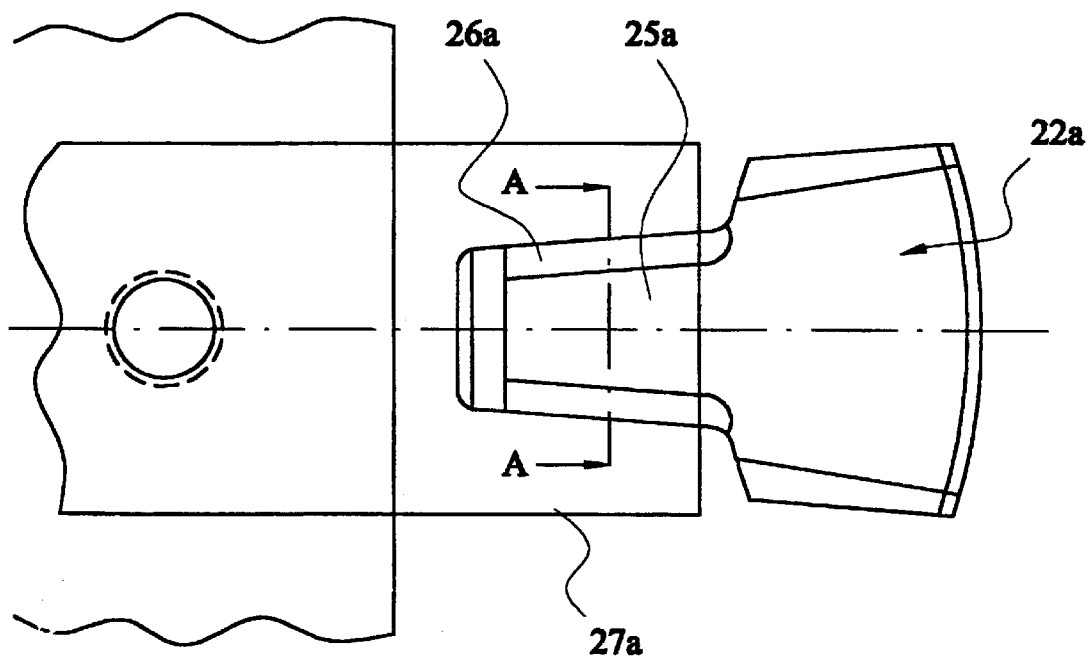
FIG. 6 is a plan view of another example of tine point tip after it has been driven to a working position mounted on the end of a cultivator tine.

An alternative type of wear part 22a is shown in FIGS. 6 to 8, in assembly with a cultivator tine or other agricultural tool 27a.

Figure 11:
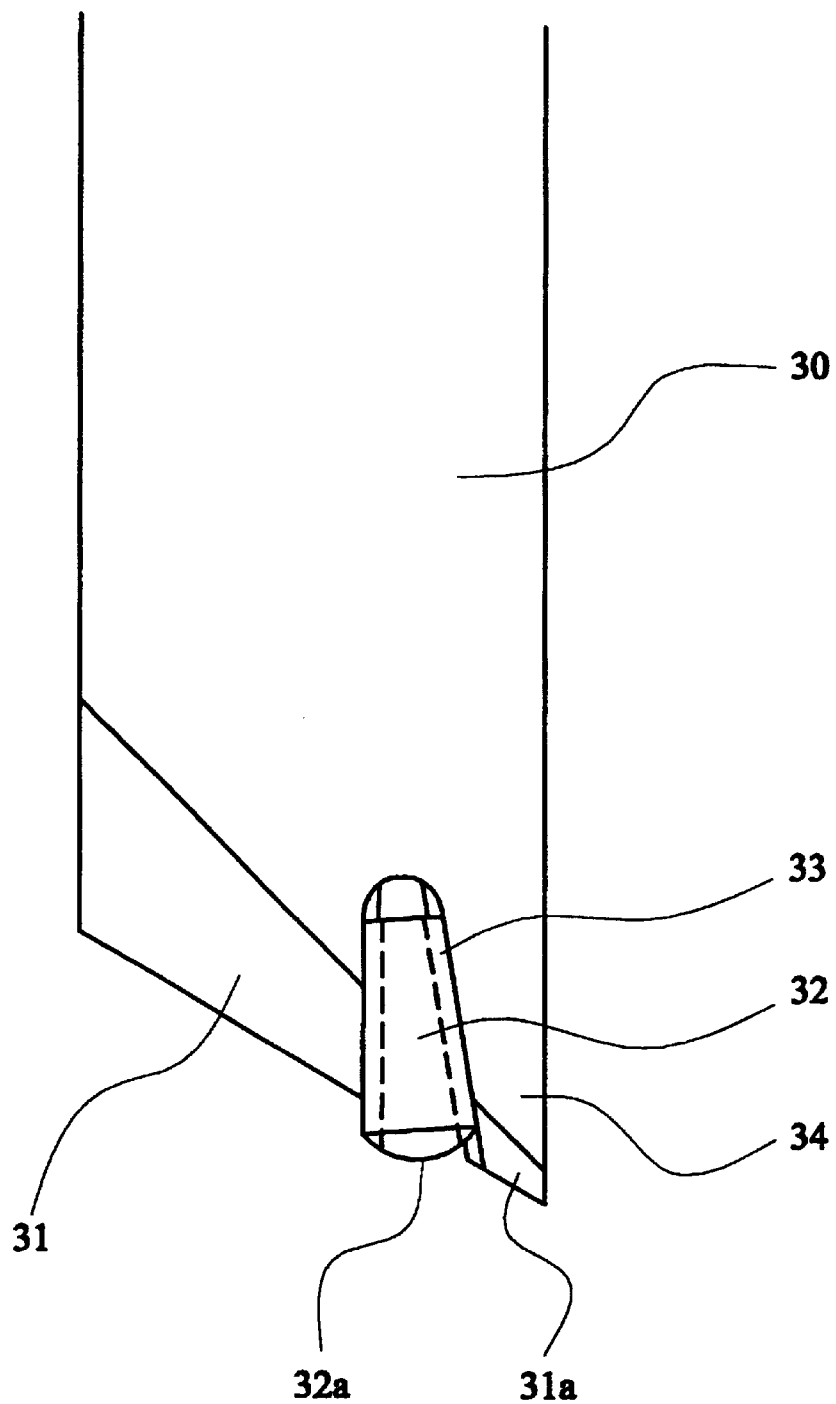
FIG. 11 is a plan view of a third embodiment of the invention, showing a replaceable wear bit mounted (by force-fit) at the leading end of an inclined leading edge of a reversible point.

Referring to FIG. 11, a third embodiment of replaceable wear part or bit is shown, for assembly with a reversible point, designated generally by reference 30. The point 30 has an inclined leading edge 31, and a replaceable wear bit 32 is driven e.g. by a hammer, to take up the working position shown in FIG. 11, within a recess or socket 33 provided in the leading end region 34 of the point 30. Again, co-operative guide formations are provided on the opposed inner side edges of the recess 33, and the opposed external sides of the wear bit 32, which provide required frictional engagement to hold the wear part 32 in the working position, after it has been driven to the working position by axial sliding movement. There is also resistance against any turning moments applied to the wear bit 32 in service.

It should be noted particularly from FIG. 11 that the wear bit 32 is located at or close to the leading edge region 31a of the inclined leading edge 31 of the point 30. Therefore, in practice, virgin or unworked soil will be engaged first by the leading end 32a of the wear bit 32, and since the wear bit 32 will be made of a material which is strongly resistant to abrasive action, it can have a long service life, and as it projects forwardly of the leading edge 31, even by a small amount, it will be exposed to the greatest wearing action of the unworked soil, and which loosens the soil, and which then undergoes further working action by continued forward movement of the leading edge 31.

The wear bit 32 is driven to the working position in the socket, and once an unacceptable level of wear has arisen, the wear bit 32 can be removed by driving a wedging tool (not shown) between the inner ends of the wear bit 32 and the recess 33 in which it is mounted.

The embodiments shown in the drawings are examples of the invention applied to agricultural tools, and replaceable wear parts or bits for use with such tools. However, the invention is applicable to other examples of working tools having a leading edge or face, exposed to a wearing action, such as the leading edge of an excavator bucket or shovel.

Usually, excavator buckets have digging teeth mounted along the leading edge, and at present the mounting of these teeth is by means of threaded fasteners, rivets and other similar fastenings. However, it should be understood that the concept of replaceable wear bits, without use of threaded fasteners, can be applied to digging teeth provided on excavator buckets and the like.

A fourth embodiment of the invention is illustrated in FIGS. 12 and 13, and comprises a holder 40, and a point 41 having a slidable inter-fit with the holder 40, by way of co-operative guide formations, and which allow the point 41 to be driven by a force extending generally perpendicular to the leading edge in order to take-up a working position in which it is secured against displacement from the working position by frictional interengagement between the guide formations, and without need for threaded or other separate removable fasteners.

The fourth embodiment shown in FIGS. 12 and 13 is generally similar to the other embodiments. Essentially, it comprises a holder of the type shown in FIG. 9, and a point of the type shown in FIG. 4. The holder 40 is mounted on a tine 42, and the holder 40 is in two parts, comprising a main part 43 forming a central holder, and to which the point 41 is detachably secured, and a rear/upper holder path 44 which is secured to the tine 42 via a single bolt 45. However, to prevent the wear holder part 44 from rotating about the volt 45, and therefore wobbling in service there is a sloping tongue 46 fitting into a corresponding notch or groove 47 in the main holder part 40.

What is claimed is:

1. A replaceable wear part for mounting on a leading edge of a working tool, said leading edge and said wear part having co-operative guide formations extending generally perpendicular to the leading edge and which provide a socket and projection type of slidable inter-fit whereby the wear part can be driven by a force extending generally perpendicular to the leading edge in order to take-up a working position in which it is secured against the displacement from the working position by frictional inter-engagement between the guide formations on the wear part and the leading edge, and without need for threaded or other separate removable fasteners, said co-operative guide formations allowing the wear part to slide in a direction generally perpendicular to the leading edge and providing a wedge-type inter-engagement between the guide formations such that the greater the distance travelled, the stronger will be the frictional engagement forces acting between the guide formations:

characterized in that the guide formations are defined by walls or faces which are matching V-shape in cross section to oppose relative rotation of the wear part about its longitudinal axis, and wherein the socket is defined between a pair of opposed side walls which are convergent or taper, and the wear part has opposed external side faces which are also convergent or taper, but to a lesser extent than the tapering of the side walls of the socket, so that an increasing wedging force is generated therebetween as the wear part is driven to its working position, whereby also the frictional resistance against possible displacement increases progressively.

2. A wear part according to claim 1, and adapted to be mounted on a transversely extending leading edge of an agricultural tool, selected from a point, a ploughshare, a cultivator tine, or a holding portion of an agricultural tool.

3. A wear part according to claim 2, in which the guide formations of the wear part are v-shaped in profile and are provided on opposed edges of a projecting mounting portion of the wear part.

4. A wear part according to claim 1, and comprising a main holder which is detachably securable to a tine, and to which point is detachably secured, and in which the holder comprises two parts, namely a main holder part and a rear/upper holder part which can be fastened to the tine via a single fastener, and which has a tongue and groove type of interfit with the main holder part to prevent rotation about the fastener, said rear/upper holding part also serving to act as a wear protecting plate for the tine.

5. A replaceable wear part for mounting on a leading edge of a working tool, said leading edge and said wear part having co-operative guide formations extending generally perpendicular to the leading edge and which provide a socket and projection type of slidable inter-fit whereby the wear part can be driven by a force extending generally perpendicular to the leading edge in order to take-up a working position in which it is secured against the displacement from the working position by frictional inter-engagement between the guide formations on the wear part and the leading edge, and without need for threaded or other separate removable fasteners, said co-operative guide formations allowing the wear part to slide in a direction generally perpendicular to the leading edge and providing a wedge-type inter-engagement between the guide formations such that the greater the distance travelled, the stronger will be the frictional engagement forces acting between the guide formations:

characterized in that the guide formations are defined by walls or faces which are matching V-shape in cross section to oppose relative rotation of the wear part about its longitudinal axis, wherein the socket is defined between a pair of opposed side walls which are convergent or taper, and the wear part has opposed external side faces which are also convergent or taper, but to a greater extent than the tapering of the side walls of the socket, so that an increasing wedging force is generated therebetween as the wear part is driven to its working position, whereby also the frictional resistance against possible displacement increases progressively.

6. A wear part according to claim 5, and adapted to be mounted on a transversely extending leading edge of an agricultural tool, selected from a point, a ploughshare, a cultivator tine, or a holding portion of an agricultural tool.

7. A wear part according to claim 5, and comprising a main holder which is detachably securable to a tine, and to which point is detachably secured, and in which the holder comprises two parts, namely a main holder part and a rear/upper holder part which can be fastened to the tine via a single fastener, and which has a tongue and groove type of interfit with the main holder part to prevent rotation about the fastener, said rear/upper holding part also serving to act as a wear protecting plate for the tine.

8. A replaceable wear part according to claim 5, in which the guide formations of the wear part are v-shaped in profile and are provided on opposed edges of a projecting mounting portion of the wear part.

9. A replaceable wear part for mounting on a leading edge of a working tool, said leading edge and said wear part having co-operative guide formations extending generally perpendicular to the leading edge and which provide a socket and projection type of slidable inter-fit whereby the wear part can be driven by a force extending generally perpendicular to the leading edge in order to take-up a working position in which it is secured against the displacement from the working position by frictional inter-engagement between the guide formations on the wear part and the leading edge, and without need for threaded or other separate removable fasteners, said co-operative guide formations allowing the wear part to slide in a direction generally perpendicular to the leading edge and providing a wedge-type inter-engagement between the guide formations such that the greater the distance travelled, the stronger will be the frictional engagement forces acting between the guide formations:

characterized in that the guide formations are defined by walls or faces which are matching V-shape in cross section to oppose relative rotation of the wear part about its longitudinal axis, and comprising a main holder which is detachably securable to a tine, and to which point is detachably secured, and in which the holder comprises two parts, namely a main holder part and a rear/upper holder part which can be fastened to the tine via a single fastener, and which has a tongue and groove type of interfit with the main holder part to prevent rotation about the fastener, said rear/upper holding part also serving to act as a wear protecting plate for the tine.

10. A replaceable wear part according to claim 9, and adapted to be mounted on a transversely extending leading edge of an agricultural tool, selected from a point, a ploughshare, a cultivator tine, or a holding portion of an agricultural tool.

11. A replaceable wear part according to claim 9, in which the guide formations of the wear part are v-shaped in profile and are provided on opposed edges of a projecting mounting portion of the wear part.

* * * * *